(12) United States Patent
Gutfleisch

(10) Patent No.: US 8,413,113 B2
(45) Date of Patent: Apr. 2, 2013

(54) DYNAMIC NAMING CONVENTIONS IN A SOURCE CODE EDITOR

(75) Inventor: Michael Gutfleisch, Wiesloch (DE)

(73) Assignee: SAP Aktiengesellschaft, Walldorf (DE)

(*) Notice: Subject to any disclaimer, the term of this patent is extended or adjusted under 35 U.S.C. 154(b) by 1163 days.

(21) Appl. No.: 12/323,172

(22) Filed: Nov. 25, 2008

(65) Prior Publication Data

US 2010/0131925 A1    May 27, 2010

(51) Int. Cl.
*G06F 9/44* (2006.01)
(52) U.S. Cl. ........................................ 717/113
(58) Field of Classification Search ............... 717/113
See application file for complete search history.

(56) References Cited

U.S. PATENT DOCUMENTS

| 5,812,853 A * | 9/1998 | Carroll et al. ............... 717/143 |
| 2009/0172651 A1* | 7/2009 | Need et al. ................ 717/146 |
| 2009/0319995 A1* | 12/2009 | Gawor et al. .............. 717/125 |

* cited by examiner

*Primary Examiner* — Chun-Kuan Lee
(74) *Attorney, Agent, or Firm* — Blakely, Sokoloff, Taylor & Zafman LLP

(57) ABSTRACT

A system and method for dynamically appending prefixes to source code is described. User-selectable options for a prefix naming convention are provided to a user. Prefixes are transiently appended to variables based on a user selection. The variables are displayed with their respective prefixes in a code editor. Modifications to the source code are detected. The prefixes are removed from the modified source code and the modified source code is written to a persistent storage.

17 Claims, 3 Drawing Sheets

DYNAMIC NAMING CONVENTIONS IN A SOURCE CODE EDITOR

FIELD

Embodiments described herein relate to computer programming and more particularly to naming conventions used in developing and/or editing source code.

BACKGROUND

Naming conventions are commonly used to increase the readability of source code. Naming conventions frequently define certain prefixes for variables depending on the date type, visibility and other metadata associated with each variable. (Naming conventions are also sometimes referred to as metadata conventions.) Consider various prefixes that can be used to distinguish data types in variables. For example, the prefix REF may indicate a reference to an object, the prefix TAB may refer to an internal table, the prefix STR may refer to a structure, etc. With respect to visibility, the prefix L, for example, may refer to a local variable, while the prefix G may refer to a global variable, etc. With respect to parameters, the prefix I, for example, may refer to an importing operation whereas the prefix E may refer to an exporting operation. In this way, a variety of prefixes may be used to describe the variable. Thus, a variable titled "city" may also have multiple prefixes such as a data type prefix, visibility prefix and/or a parameter prefix.

The examples of prefixes described above are frequently used by developers to provide them with additional information about the variables that they are using. However, there are several problems that can arise in using a particular naming convention to label variables with prefixes. For example, developers and others frequently disagree about the naming convention (e.g., which labels to use for various prefixes). In addition, naming conventions can lead to inconsistencies, for example, if someone changes the type of the variable but forgets to adjust its name and/or its prefix accordingly. Also, some people feel that the use of prefixes deflects from the main intention of the variable which is to represent a particular thing (e.g., city, population, etc.).

Prefixes naming conventions must be followed by developers, necessitating that they be familiar with the rules for building the variable names. Typically naming conventions change over time or multiple naming conventions exist in parallel at the same time. This occurs especially in large organizations. Thus, not only can the choice of naming conventions be an enormously controversial issue (with partisans of each convention holding theirs to be the best and others to be inferior), but each person may have difficulty adapting to naming conventions as they are chosen or changed.

A typical approach to enforce the right usage of naming conventions is to check the adherence of each developer by using a check program. In check programs, the rules are programmed and/or configured and checked automatically. When violations occur, developers receive e-mails indicating violations and instructing them to correct the violations.

SUMMARY OF THE DESCRIPTION

A system and method for dynamically appending prefixes to source code is described. User-selectable options for a prefix naming convention are provided to a user. Prefixes are transiently appended to variables based on a user selection. The variables are displayed with their respective prefixes in a code editor. Modifications to the source code are detected. The prefixes are removed from the modified source code and the modified source code is written to a persistent storage.

BRIEF DESCRIPTION OF DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein described various embodiments and implementations of the invention, and do not necessarily all refer to the same embodiment. However, they are also not necessarily mutually exclusive.

DETAILED DESCRIPTION

Figure 1:
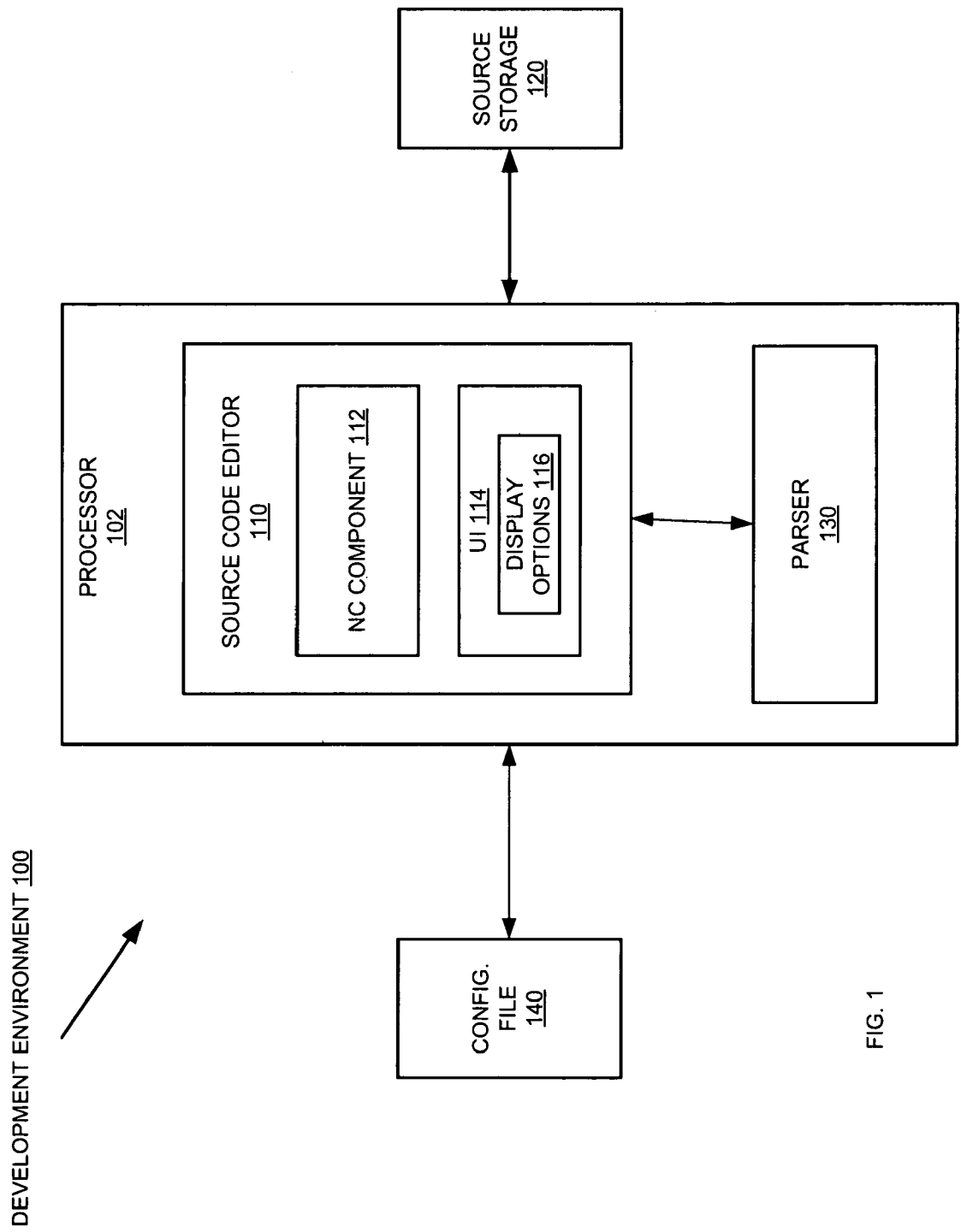
FIG. 1 is a block diagram illustrating a system according to various embodiments.

As provided herein, methods, apparatuses, and systems provide dynamic naming conventions for programming code (e.g., source code) and code editing. The dynamic naming conventions allow different people to view and edit code in a code editor based on customizable/configurable prefix displays. Additionally, the dynamic naming convention techniques described herein may contribute to reduced coding errors.

A development environment, or more specifically, a compiler, inherently knows if a certain variable is, for example, a local variable or an attribute; it also knows if the variable is a reference type to an object or an integer type or something else. People who read/edit source code sometimes want to have this information about variables visualized. For example, one developer may prefer to see a variable displayed as "IM_REF_CITY," while another developer prefers to see "IO_CITY." A 3rd developer might be just as happy to see "CITY." Thus, in various embodiments, these different expectations are fulfilled in the presentation layer of the development environment. Each developer is provided the opportunity to configure the display of source code according to his/her personal preferences (e.g., visualizing scope, type and other information, etc.).

Programming code, for example, source code, is typically stored in a persistent storage. The code is comprised of various expressions, each having one or more variables. In various embodiments, the source code variables are stored in the persistent storage with no prefixes. In some embodiments, the source code may be stored with the variables having prefixes according to a particular naming convention. In either case, a code editor that displays the source code and provides an interface for a developer or user to modify the source code transiently appends and/or replaces prefixes to the variables based on a user-selected prefix naming convention. Thus, variables are displayed having prefixes as defined by the user-selected prefix naming convention.

In various embodiments, the user may select from a variety of prefix naming conventions. In some embodiments, variables are displayed according to a particular prefix naming convention based on an identity of the user (e.g., based on a user identification, login, etc.). Furthermore, in some embodiments, a user may select to display variables according to one prefix naming convention for one project while selecting to view variables according to a different prefix naming convention in a different project. Additionally, a user may have variables displayed according to a combination/hybrid prefix naming convention that combines aspects of multiple prefix naming conventions. The user, having the source code displayed according to the user-selected prefix naming convention, may then edit and/or modify the source code using the source code editor.

Given that the source code is displayed according to a selected prefix naming convention, it is likely that the user will modify the source code and/or enter new source code according to the same selected prefix naming convention. While this is the most probable scenario, in various embodiments it is not necessary that the user modify source code by adding prefixes according to the selected naming convention. In such embodiments, the user may enter variables and/or modify variables without using prefixes and the source code editor will automatically append prefixes to those variables according to the selected prefix naming convention.

In some embodiments, when a modification to the source code is detected, the source code may be parsed to determine a variable type for each variable and a prefix pattern can then be identified for the variables in the source code. In other words, the source code editor may be able to detect inconsistencies and/or errors in modified source code and automatically fix those errors by reconciling modifications that do not match or follow an identified prefix pattern or a selected naming convention.

When the user has completed modifications to the source code and desires to store the modifications to source code in the persistent storage (or if the system automatically and periodically writes modifications of the source code to persistent storage), the prefixes according to the selected prefix naming convention are removed from each of the variables in the modified source code. In some embodiments, the modified source code is then written to the persistent storage without prefixes. In other embodiments, modified source code is written to persistent storage according to a system prefix naming convention that may be a different prefix naming convention than that selected by the user for display in the source code editor.

FIG. 1 is a block diagram illustrating a system according to various embodiments. In particular, a development environment 100 is shown. Development environment 100 includes processor 102 in which source code editor 110 operates. Source code is stored in source storage 120. Source storage 120 may be any type of persistent storage such as, for example, memory, flash memory, EPROMs, EEPROMs, ROMs, RAM, etc. Source code editor 110 displays source code stored in source storage 120 and provides an interface for a user to modify the source code. Source code editor 110 accesses a configuration file 140 that contains various configuration details of a prefix naming convention. Configuration file 140 may include multiple prefix naming conventions. Alternately, multiple configuration files may be accessed, each of which includes its own separate prefix naming convention. Source code editor 110 links to configuration file 140 and allows a user to select one of the prefix naming conventions from the prefix naming conventions stored in configuration file 140. Thus, the user may interact with source code editor 110 to select for display a prefix naming convention of his/her choice.

Source editor 110 includes a naming convention component 112. Naming convention component 112 takes the source code as it stored in source storage 120 and displays it according to the prefix naming convention by utilizing the configuration information in configuration file 140. Thus, source code is displayed in source code editor 110 according to the user-selected prefix naming convention. However, the displayed source code does not affect the source code as it is stored in source storage 120. This is because naming convention component 112 removes any prefixes used for display in source code editor 110 before sending the code to be written back to source storage 120. In other words, source code is stripped of its prefixes before being written to source storage 120. The naming convention component also detects modifications to the source code. For example, in some embodiments, naming convention component 112 uses both configuration file 140 (or more particularly, a prefix naming convention stored in configuration 140) and the source code as it is stored in source storage 120 to determine modifications made by the user.

Source code editor 110 also includes a user interface (UI) 114 that provides various user-selectable display options 116 for displaying source code. Display options 116 might include options to show variable visibility, type, parameter, etc. Display options 116 could be shown in a pop-up window or other UI element of UI 114.

In some embodiments, source code editor 110 detects a modification to the source code, causing a parser 130 to parse the source code and determine a variable type for each variable. In other words, parser 130 can determine whether a particular variable is, for example, a reference to object, an internal table, structure, character, integer, etc. Based on the determination of parser 130 as to the variable type for each variable, naming convention component 112 can identify a prefix pattern for variables (in particular modified variables) in the source code. Based on the identified prefix pattern of the variables, naming convention component 112 can identify a prefix naming convention that is consistent with the identified prefix pattern. Thus, naming convention component 112 can reconcile any variable prefixes that do not follow the identified prefix pattern.

The reconciliation is performed by matching or correcting variable prefixes according to the identified prefix naming convention. In other words, in various embodiments, prefix modification mistakes can be caught, identified, fixed and/or prevented by naming convention component 112. In embodiments where source code is actually stored in source storage 120 according to a particular prefix naming convention, then the variable prefixes can be stored in source storage 120 as reconciled.

Figure 2:
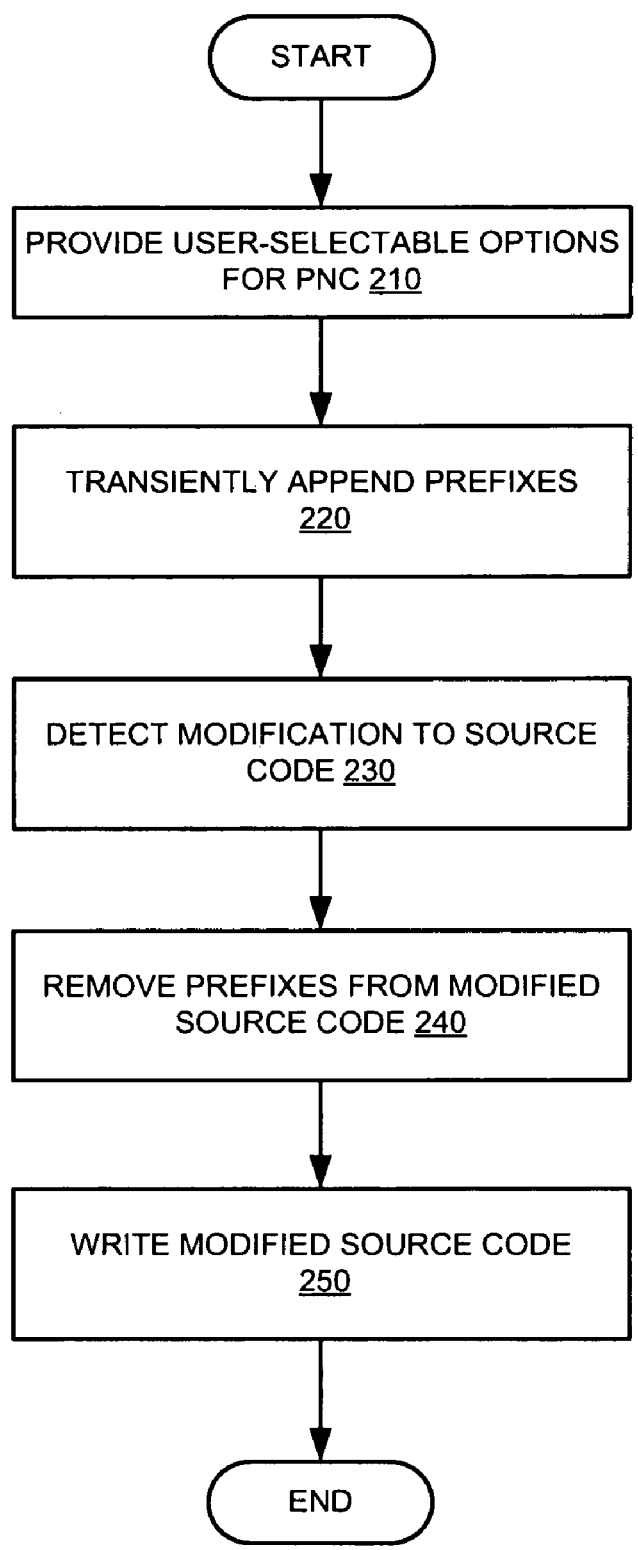
FIG. 2 is a flow diagram of operation in a system according to various embodiments.

FIG. 2 is a flow diagram of operation in the system according to various embodiments. User-selectable options for a prefix naming convention (PNC) are provided 210. For example, a source code editor may include a drop-down window, a display button, etc., to allow a user to select from a plurality of prefix naming conventions to use for displaying source code in the source code editor. Once the source code editor has received a selection, prefixes according to the selected prefix naming convention are transiently appended 220 to the variables in the source code and displayed in the source code editor. Embodiments herein refer to variable prefixes; however, one of skill in the art will appreciate that other types of modifications to variables may be used in other embodiments. For example, postfixes may be appended to variables in a manner similar to the way prefixes are appended to variables. Additionally, prefixes may include multiple types of information to add visualization to various aspects of variables. For example, a prefix (or postfix, etc.) may indicate any combination of visibility, data type, parameters, etc. In some embodiments, variables can be visualized in ways other than by adding prefixes or postfixes, such as, for example, adding colors, tool tips, links, or icons to the variables.

A modification to the source code is detected 230 (e.g., by the source code editor). In various embodiments, it is likely that modifications to this source code will be made according to the user-selected prefix naming convention; however, it is not necessary that modifications to source code be made according to the user-selected prefix naming convention. In either case, modifications to source code are displayed in the source code editor.

Prefixes that were transiently appended to the source code (as well as any prefixes added during code modification) are removed 240 from the source code prior to writing the modified source code to persistent storage. In this way, the user-selected naming convention is limited to the presentation layer of the source code editor and is not propagated to the source code storage. Thus, the modified source code is written to the persistent storage. In some embodiments, the source code is written 250 without the user-selected prefixes. In other embodiments, the source code may still be stored according to a prefix naming convention, but not necessarily prefix naming convention selected by the user. Hence, the need to strip and/or remove prefixes from the modified source code before writing source code to the persistent storage.

Figure 3:
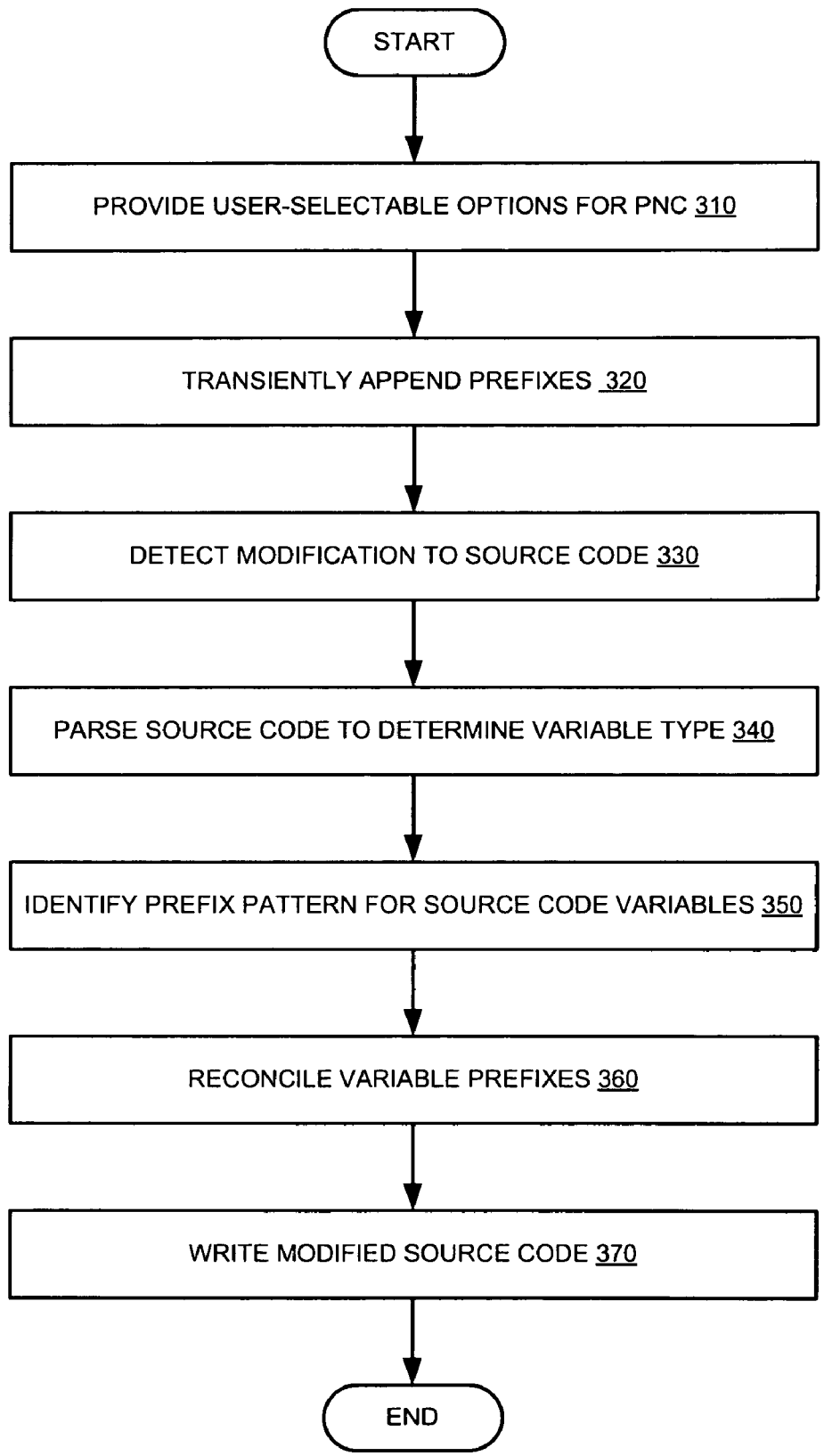
FIG. 3 is a flow diagram of operation in a system according to various embodiments.

FIG. 3 is a flow diagram of operation in a system according to various assignments. Similar to FIG. 2, a code editor provides user-selectable options for a prefix naming convention (PNC) 310. Based on the user selection, prefixes are transiently appended 320 to variables in the source code for display in a source code editor. In some embodiments, more than one prefix naming convention can be selected and multiple prefix naming conventions and/or a hybrid naming convention can be used in displaying variables in the source code editor.

Modifications to the source code are detected 330. The source code is parsed to determine a variable type for each variable in the source code 340. The source code can be parsed automatically on a periodic basis or can be parsed in response to a manual command (e.g., a user selection). Based on the parsing of the source code, a prefix pattern for variables in the source code is identified 350. The identified prefix pattern may correspond to a known prefix naming convention. In embodiments where an identified prefix pattern does not match a known prefix naming convention, a new prefix naming convention may be generated based on the identified prefix pattern.

In the process of parsing the source code and identifying one or more prefix patterns for variables in the source code, the source code editor may reconcile variable prefixes that do not follow the identified prefix pattern. In other words, inconsistent and/or erroneous variable prefixes can be automatically edited to match the known prefix naming convention or the newly created prefix naming convention. Once variable prefixes have been reconciled, the source code is written 370 to the persistent storage (including the reconciled variable prefixes). Again, in some embodiments, the source code may be stored without any variable prefixes (e.g., in a generic form), but in embodiments where the source code is stored according to a particular prefix naming convention, the persistent storage can be updated with reconciled variable prefixes based on the parsing of the source code and the identifying of prefix patterns.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, embodiments of the invention may be downloaded as a computer program which may be transferred from a memory of a remote computer (e.g., a server) to a memory of a requesting computer (e.g., a client).

Various components described herein may be a means for performing the functions described herein. Each component described herein includes software, hardware, or combination of these. The operations and functions described herein can be implemented as software modules, hardware modules, special-purpose hardware (e.g., application specific hardware, application specific integrated circuits (ASICs), digital signal processors DSPs, etc.), embedded controllers, hardwired circuitry, etc.

Aside from what is described herein various modifications may be made to the disclosed embodiments and implementations of the invention without departing from their scope. Therefore, the illustrations and examples herein should be construed in an illustrative, and not a restrictive sense.

What is claimed is:

1. A method, comprising:
   storing source code in a persistent storage, the source code having variables;
   transiently appending, by naming convention component execute by a processor of a computer system, a prefix defined by a user-selected prefix naming convention to each of the variables for display in an editor;
   detecting a modification to the source code;
   parsing the source code to determine a variable type for each variable; and
   identifying a prefix pattern for variables in the source code, the prefix pattern corresponding to a prefix naming convention.

2. The method of claim 1, further comprising:
   providing a plurality of user selectable options for the displayed prefix naming convention.

3. The method of claim 1, further comprising:
   reconciling variable prefixes that do not follow the identified prefix pattern to match the prefix naming convention; and
   writing the modified source code, including the reconciled variable prefixes in the persistent storage according to the prefix naming convention.

4. The method of claim 1, further comprising:
   displaying the source code variables to have a visualized scope.

5. The method of claim 1, further comprising:
   displaying the source code variables to have a visualized variable type.

6. A method, comprising:
   storing source code in a persistent storage, the source code having variables;
   transiently appending, by naming convention component execute by a processor of a computer system, a prefix defined by a user-selected prefix naming convention to each of the variables for display in an editor;
   detecting a modification to the source code, the modification according to the user-selected prefix naming convention;
   removing the prefixes from each of the variables in the modified source code; and
   writing the modified source code to the persistent storage.

7. A non-transitory machine accessible storage medium containing instructions that, when executed, cause a machine to:

store source code in a persistent storage, the source code having variables;

transiently append a prefix defined by a user-selected prefix naming convention to each of the variables for display in an editor;

detect a modification to the source code;

parse the source code to determine a variable type for each variable; and identify a prefix pattern for variables in the source code, the prefix pattern corresponding to a prefix naming convention.

8. The non-transitory machine accessible storage medium of claim 7, wherein the instructions comprise further instructions to cause the machine to:

provide a plurality of user selectable options for the displayed prefix naming convention.

9. The non-transitory machine accessible storage medium of claim 7, wherein the instructions comprise further instructions to cause the machine to:

reconcile variable prefixes that do not follow the identified prefix pattern to match the prefix naming convention; and write the modified source code, including the reconciled variable prefixes in the persistent storage according to the prefix naming convention.

10. The non-transitory machine accessible storage medium of claim 7, wherein the instructions comprise further instructions to cause the machine to:

display the source code variables to have a visualized scope.

11. The non-transitory machine accessible storage medium of claim 7, wherein the instructions comprise further instructions to cause the machine to:

display the source code variables to have a visualized variable type.

12. A non-transitory machine accessible storage medium containing instructions that, when executed, cause a machine to:

store source code in a persistent storage, the source code having variables;

transiently append a prefix defined by a user-selected prefix naming convention to each of the variables for display in an editor;

detect a modification to the source code, the modification according to the user-selected prefix naming convention;

remove the prefixes from each of the variables in the modified source code; and write the modified source code to the persistent storage.

13. A system, comprising:

a persistent storage to store source code having variables;

a processor coupled to the persistent storage to execute a naming convention component to transiently append a prefix defined by a user-selected prefix naming convention to each of the variables for display in an editor;

the editor to detect a modification to the source code;

a parser to parse the source code and deteiniine a variable type for each variable; and the naming convention component to identify a prefix pattern for variables in the source code, the prefix pattern corresponding to a prefix naming convention.

14. The system of claim 13, further comprising:

the editor to provide a plurality of user selectable options for the displayed prefix naming convention.

15. The system of claim 13, further comprising:

the naming convention component to reconcile the variable prefixes that do not follow the identified prefix pattern to match the prefix naming convention; and the persistent storage to write the modified source code, including the reconciled variable prefixes, according to the prefix naming convention.

16. The system of claim 13, further comprising:

displaying the source code variables to have one or more of a visualized scope or a visualized variable type.

17. A system, comprising:

a persistent storage to store source code having variables;

a processor coupled to the persistent storage to execute a naming convention component to transiently append a prefix defined by a user-selected prefix naming convention to each of the variables for display in an editor;

the naming convention component to detect a modification to the source code, the modification according to the user-selected prefix naming convention;

the naming convention component remove the prefixes from each of the variables in the modified source code; and the persistent storage to write the modified source code.

* * * * *

UNITED STATES PATENT AND TRADEMARK OFFICE
CERTIFICATE OF CORRECTION

PATENT NO. : 8,413,113 B2
APPLICATION NO. : 12/323172
DATED : April 2, 2013
INVENTOR(S) : Michael Gutfleisch It is certified that error appears in the above-identified patent and that said Letters Patent is hereby corrected as shown below:

In the Claims

Column 8, Claim 13, line 13, please delete "deteiniine" and insert --determine--.

Signed and Sealed this
Second Day of July, 2013

Teresa Stanek Rea
*Acting Director of the United States Patent and Trademark Office*